F. BERGIER.
ELECTRICAL TIRE SIGNALING DEVICE.
APPLICATION FILED JULY 11, 1917.
1,369,725.
Patented Feb. 22, 1921.
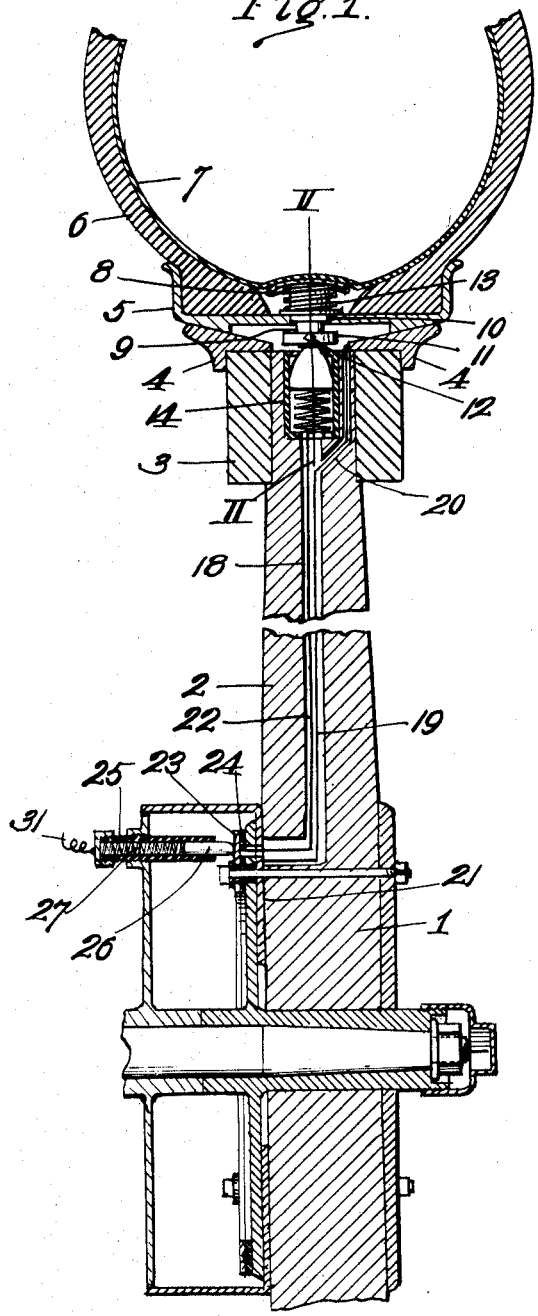
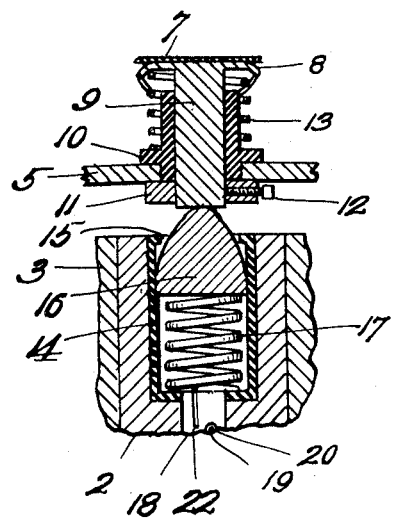
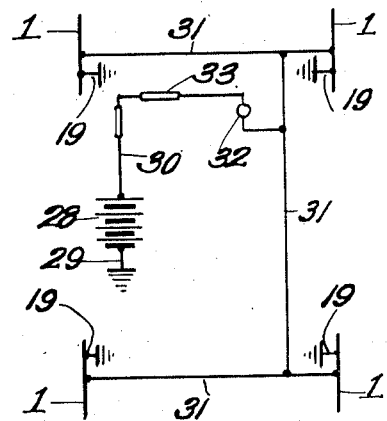
Inventor,
Frank Bergier.

UNITED STATES PATENT OFFICE.

FRANK BERGIER, OF MANHATTAN, KANSAS.

ELECTRICAL TIRE-SIGNALING DEVICE.

1,369,725.  Specification of Letters Patent.  Patented Feb. 22, 1921.

Application filed July 11, 1917. Serial No. 179,994.

*To all whom it may concern:*

Be it known that I, FRANK BERGIER, a citizen of the United States, residing at 1000 Bluemont avenue, in the city of Manhattan, in the county of Riley and State of Kansas, have invented a new and useful Electrical Tire-Signaling Device, of which the following is a specification.

This invention relates to electrical tire signaling devices, and more especially to devices for use in conjunction with demountable rim tires, and my object is to produce a device of this character in which deflation of the tire is instantly followed by the completion of an electric circuit and the operation of a signal to call the condition of the tire to the attention of the driver of the car.

More specifically my object is to produce an electric tire signaling device comprising mechanism carried by the body of the wheel and mechanism carried by the rim, and of such construction that the slipping of the rim onto the body of the wheel places said mechanism in operative relation without further attempt on the part of the operator. A signaling device of this character will enable the driver of a car to maintain the tires inflated to the proper degree and thereby minimize the chance of puncture, practically eliminate the possibility of rim cuts and generally prolong the life of the tire.

With these objects in view the invention consists in certain novel and useful features of construction and combination of parts as hereinafter described and claimed; and in order that it may be fully understood reference is to be had to the accompanying drawing, in which:—

Figure 1 is a fragmentary central vertical section of a wheel equipped with signaling mechanism embodying the invention.

Fig. 2 is an enlarged section taken on the dotted line II—II of Fig. 1.

Fig. 3 is a diagrammatic view showing the electrical connection of a car equipped with this improved signaling device.

In the said drawing, 1 indicates the wheels of a motor car, 2 one of the spokes of the wheel, and 3 the felly of the wheel. 4 indicates wedge rings of the type shown or any other suitable or preferred type, mounted on the felly for holding the demountable rim 5 thereon. 6 is the tire and 7 the inner tube thereof.

Arranged radially in the rim and adapted for endwise movement, is a pin comprising a rounded head 8 bearing against the exterior of the inner tube, and a shank 9, the latter fitting in an insulating sleeve 10 mounting in the rim. A collar 11 fitted upon the inner end of the shank is held adjustable thereon by the set screw 12, and a spring 13 fitting around the sleeve 10 and bearing against the same at one end and against the head 8 at the other end, tends to slide the pin outwardly and bring the collar 11 into contact with the rim, as shown in Fig. 2. Normally however, the tube 7 if properly inflated, exerts sufficient pressure on the head of said pin to prevent contact between the collar 11 and the rim, as shown by Fig. 1.

In each wheel one of the spokes in line with the pin mentioned, is provided with a socket containing a tubular holder 14 having a constricted mouth 15 at its end, and fitting slidingly in said holder is a slidable contact 16, preferably of tapered form so that it may project or protrude through the constricted mouth of said holder and yet be incapable of being ejected from the latter under the pressure of the spring 17 fitted in the holder and bearing against the bottom thereof and the said slidable contact 16. The spoke is provided with a bore or passage 18 for an insulated conductor 19, and the latter near the outer end of the spoke extends through a branch bore or passage 20 and is electrically connected at its outer end to one of the rim wedges 4. The conductor 19 is electrically connected at its inner end to the drum 21 of the wheel. A similar conductor 22 extends through the bore 18 and is connected at its outer end to the spring 17 and at its inner end to a metal ring 23 held out of contact with the drum by a ring 24 of insulating material. An insulating sleeve 25 is carried by the wheel and the carbon or equivalent contact brush 26 therein is held by a spring 27 against the contact ring 23 during the rotation of the latter with the wheel. In this connection attention will be called to the fact that the wheel shown is one of the rear wheels of a car, and that the connection must be modified slightly for use in connection with the front wheels. As this however, does not form a part of the invention it is not deemed necessary to illustrate or particularly describe the connection on the front wheel, as any suitable connections may be provided which will maintain the contact between the ring 23 and brush 26 regardless of the position of the wheels.

The car will be equipped with a storage battery as at 28 grounded as at 29 and connected by conductors 30 and 31 to the brushes 26, the arrangement being such that the engagement of any one of the contact collars 11 with the rim of its wheel, will establish a circuit and operate the alarm device 32, which may be of audible or visual type or both, without departing from the principle of construction involved. At a suitable point, preferably in the conductor 30, a manually operable switch 33, is provided for the simultaneous breaking of circuits through all four wheels, when desirable.

With the parts in the position shown by Fig. 1, it is obvious that the contact collar 11 can not come into contact with the rim 5, hence the circuit from the battery through the particular parts mentioned is broken, and said parts remain in this relation as long as the inner tube is properly deflated. In the event however, said tube is punctured or otherwise loses sufficient pressure to permit spring 13 to force the headed pin outward until collar 11 engages the rim, it will be seen that a circuit will be completed through the battery and the alarm device 32 and thus draw the attention of the driver to the condition of his tire. This statement of course applies to all four wheels and the operation will be the same should more than one tire puncture at the same moment. It will be understood that the spring 17 coöperates with spring 13 in forcing the pin outward, but that the former is chiefly concerned in maintaining a contact between the contact 16 and the pin, and in permitting contact 16 to slide inward when the rim is fitted upon the wheel, as in such action the engagements of the edge of the collar 11 or the inner end of the said pin with the tapered end of the contact 16, will cause the latter to yield inwardly. For this reason it is necessary that the outer end of the contact 16 shall be tapered. Of course it might be practicable to taper the end of the shank 9 of the said pin and obtain the same result, but this is not thought desirable because the pressure within the inner tube might be too great to permit this action to take place without interfering to some extent with the facility of placing the rim upon the wheel. It will be obvious that when the rim is removed, no special attention need be given the mechanism described, as there is simply frictional contact between the contact 16 and the pin 9, and the former is prevented from being pushed completely out of the holder by the constricted mouth thereof.

From the above description it will be apparent that I have produced an electrical tire signaling device which embodies the features of advantage set forth as desirable in the statement of the objects of the invention, and which is susceptible of modification in minor particulars without departing from the principle of construction involved or sacrificing any of the advantages of the appended claims.

I claim:

1. The combination of a wheel, a demountable rim thereon, a casing upon the rim and an inner tube within the casing, means radially movable through and insulated from the rim and externally engaging the inner tube, yielding means adapted for moving said first-named means outward of the wheel and into engagement with said rim, in the event the pressure in the inner tube falls below a predetermined degree, a contact on and insulated from the felly of the wheel, and in frictional engagement with the inner end of the radially-movable means, and conductors electrically connecting the last-named contact and the rim.

2. The combination in a wheel of a felly, a demountable rim thereon, a casing upon the rim and an inner tube within the casing, with means radially movable through and insulated from the rim and externally engaging the inner tube, yielding means adapted for moving said first-named means outward of the wheel and into engagement with said rim, in the event the pressure in the inner tube falls below a predetermined degree, a spring-pressed contact mounted in the felly and bearing outwardly against said first-named means, and conductors electrically connected to said spring-pressed contact and to said rim.

3. The combination in a wheel, of a felly, a demountable rim thereon, a casing upon the rim and an inner tube within the casing, with a pin radially movable through and insulated from the rim and provided with a rounded head externally engaging the inner tube, an adjustable collar on the inner end of said pin and normally held by the pressure of the inner tube on said pin, out of contact with the rim, a tapered contact slidable radially in a socket in the felly, a spring in said socket for holding said contact pressed against said pin, and circuit wires respectively connected to said rim and tapered contact.

FRANK BERGIER.

Witnesses:
C. E. SCHERMERHORN,
A. M. JOHNSTON.